United States Patent [19]
Shenoy et al.

[11] Patent Number: 5,455,924
[45] Date of Patent: Oct. 3, 1995

[54] APPARATUS AND METHOD FOR PARTIAL EXECUTION BLOCKING OF INSTRUCTIONS FOLLOWING A DATA CACHE MISS

[75] Inventors: Sunil R. Shenoy, Portland; James W. Wong, Beaverton, both of Oreg.

[73] Assignee: Intel Corporation, Santa Clara, Calif.

[21] Appl. No.: 15,655

[22] Filed: Feb. 9, 1993

[51] Int. Cl.$^6$ ................................................ G06F 12/00
[52] U.S. Cl. ...................... 395/445; 395/479; 395/180; 364/DIG. 1
[58] Field of Search ................................ 395/425, 275, 395/575; 364/DIG. 1

[56] References Cited

U.S. PATENT DOCUMENTS

| | | | |
|---|---|---|---|
| 4,884,197 | 11/1989 | Sachs et al. | 395/425 |
| 5,025,366 | 6/1991 | Baror | 395/425 |
| 5,222,224 | 6/1993 | Flynn et al. | 395/425 |

*Primary Examiner*—David L. Robertson
*Assistant Examiner*—Sheela N. Nadig
*Attorney, Agent, or Firm*—Blakely, Sokoloff, Taylor & Zafman

[57] ABSTRACT

A partially blocking data cache having improved microprocessor performance while maintaining data consistency between external memory and cache memory. The data cache of the present invention is used in a computer system and is partially blocking in that this cache will block the execution of any store instructions subsequent to an outstanding load instruction that missed the cache. The present invention offers increased microprocessor efficiency by allowing execution of subsequent load instructions while less than a predetermined number of preceding load instructions are still outstanding. The present invention utilizes a counter within the data cache unit to track the number of outstanding load misses. The present invention provides increased performance without undue or overly complex modifications to existing caching systems. The present invention operates advantageously within a computer system having a relatively large number of registers associated with the microprocessor such that store instructions represent a relatively small number of the instructions executed by the microprocessor.

63 Claims, 5 Drawing Sheets

APPARATUS AND METHOD FOR PARTIAL EXECUTION BLOCKING OF INSTRUCTIONS FOLLOWING A DATA CACHE MISS

BACKGROUND OF THE INVENTION

(1) Field of the Invention

The present invention relates to the field of memory accessing technology for the storage and retrieval of data and/or instructions from a memory unit. Specifically, the present invention relates to the field of memory cache technology employed to increase the speed and efficiency of memory accessing.

(2) Prior Art

Among the many elements of a computer system are found a central processing unit (CPU), memory storage units (which may be RAM or ROM or other), and interface and control logic units that couple the CPU to the memory storage units for accessing and processing of data and instructions. Generally, each time the CPU processes an instruction it must access a memory storage unit to gain desired data for processing or to obtain the execution instruction itself. For whatever reason, the CPU is constantly interfacing with the memory storage units. Recent developments in computer technology have offered a variety of different types of memory storage units which are adapted for different functions and have different characteristics. Specifically, use of a data cache memory unit and associated logic has become extremely popular because of the versatility and efficiency of data accessing offered by the data cache memory.

A data cache is a special purpose memory unit that is designed for special interface with the CPU. The data cache is typically a small sized specially designed memory unit designed for high speed access to the CPU of a microprocessor. Typically the data cache is of limited size because of the constraints of interfacing the cache with the CPU. The cache memory is designed to specially interface with the CPU so that the CPU can access the data of the cache at very high speeds verse the relative long data accessing required of other, external, memory units. Many cache units are located structurally within the chip containing the microprocessor unit for high speed accessing. A cache is filled with data that the CPU will probably execute on a routine or cyclic basis. This data is placed into the cache memory from the external memory (or generated by the CPU and placed into the cache memory) typically during the execution steps of a program. That is, the most recently used data, determined by monitoring the data flow through the program execution, is placed into the cache memory. New data is placed or replaced into the cache and tagged for identification while older data (i.e., data not accessed over a given time period) is slowly "aged out" or removed from the cache. The memory placed within the cache is also tagged with a unique identifier that is related to the effective memory address associated with the data of the external memory unit.

During program execution when the CPU desires to access (i.e. load or store) data to a particular address within the external memory unit, a special cache logic unit first scans the contents of the cache memory unit to determine if the desired address is located within the high speed cache. If so, the data is accessed via the cache utilizing the tag identifier and the position of the data within the cache. In this case external memory access is not required and therefore the delay associated with external memory access is avoided. Each time data is accessed via the cache a significant amount of processing time is saved by avoiding the delay associated with the external memory. Therefore, memory cache operations or "cache operations" refer to the cache procedure and theory discussed above. Cache operations function on the theory that many computer programs frequently utilize only a relatively small number of data addresses on a cyclic basis and those commonly used values will end up located within the high speed cache memory providing efficient access.

In the event that the desired data is determined to be not within the data cache, the cache logic unit will indicate that a "cache miss" has occurred associated with the access instruction (i.e., a miss load or a miss store) and the instruction causing the miss is called the missed instruction. When a cache miss occurs, the desired data must be accessed from, or to, the external memory which is usually not associated with the structural location of the cache memory unit. This accessing to the external memory takes longer than a cache memory access. During the delay, the many prior art CPUs may not issue further instructions while the address in external memory is being accessed associated with the missed instruction due to problems of data inconsistency. These further instructions are called subsequent instructions to the missed instruction.

A prior art cache system is illustrated in the block diagram of FIG. 1.0. The external memory unit 60 is illustrated coupled to interface control unit 14 which provides controlled access to the external memory 60. A high speed limited size cache unit 10 is illustrated coupled to the logic unit 14. The high speed cache unit is coupled to a microprocessor instruction processor 50 via a cache control unit 12 which controls accessing to the cache between microprocessor instructions and determines whether or not data associated with the microprocessor instructions resides in cache or not. The microprocessor instruction processor 50, the logic unit 12 and the high speed cache 10 are all located within the chip of the microprocessor 5. Because of this location, and other special characteristics, the cache memory 10 allows high speed, efficient interface to the microprocessor. After an instruction generating a cache miss is encountered, the instruction is executed through the external memory 60. When the desired data is obtained via the logic unit 14, it is forwarded to the microprocessor unit 50 for processing. The data is also placed into the cache 10 and tagged for subsequent use.

Prior Cache Systems

Prior cache systems are either totally microprocessor blocking or non-blocking. In a totally blocking system, each time there is a miss instruction every subsequent instruction, either a load or a store instruction, must be suspended until the miss instruction is completely executed (i.e., until external memory 60 is accessed). This is done by stalling or blocking execution of the microprocessor and must be done to prevent data inconsistencies between the subsequent instructions and the miss instructions. Therefore, after a load instruction generating a cache miss load instruction all subsequent load instructions will be stalled until the cache miss load instruction is fully executed through external memory. Obviously, this implementation does provide for data consistency but at a reduced operational speed due to the large number of stalls generated for each cache miss state. This prior art system does not differentiate between the character of the subsequent operations to determine if they are dependent or independent on the result of the missed instruction or if the subsequent instructions may be allowed to execute out of order without causing data inconsistencies. This totally blocking prior art system merely prohibits execution of any instruction following a miss instruction that has not completed execution (i.e., while a miss instruction is currently outstanding). These prior art systems are not advantageous because processing performance of the microprocessor is degraded due to the continual blocking of instructions on the occurrence of miss instructions; therefore, these systems are not very efficient. What is needed is a system that offers improved system efficiency while protecting data consistency and integrity. What is needed is a system that allows some subsequent instructions to operate using the cache even though a precedent and outstanding instruction has not been totally executed. The present invention offers such capability.

Other prior art cache systems are non-blocking in that they never block subsequent instructions. From a performance standpoint these systems Operate very rapidly and efficiently. However, these systems employ extremely complex and advanced circuitry to insure data consistency during the operation of subsequent instructions since some instructions will be executed out of order. This complex circuitry requires high performance and often expensive components that are not appropriate for all systems and designs. Moreover, it is very difficult and complex to integrate these data cache units into conventional microprocessor designs. What is needed is a system that protects data consistency, provides for efficient operation but yet does not require overly complex design or implementation and may be integrated into conventional microprocessor design with modest modifications. The present invention offers such capability.

In view of the above, it is an object of the present invention to provide a method and apparatus for providing an efficient system of memory caching by employing a partially blocking data cache scheme. It is an object of the present invention to implement the partially blocking data scheme without overly complex and advanced circuits so that the partially blocking data scheme can be implemented into existing caching systems without undue expense or modification. It is further an object of the present invention to provide the above advantages in a system that absolutely insures data consistency. A further object of the present invention is to provide a very efficient partially blocking caching system which can be advantageously utilized by a microprocessor having a relatively large number of registers with very little loss of performance.

Another object of the present invention is to provide processing efficiency and data consistency by allowing some subsequent instructions of a first type to be executed during the time while a precedent instruction remains outstanding but yet stalling other subsequent instructions of a second type during the same period. It is appreciated that other objects of the present invention not specifically enumerated herein will become apparent in discussions to follow.

SUMMARY OF THE INVENTION

The present invention is drawn to a system, apparatus and method for a partially blocking data cache. As such the present invention includes a partially blocking cache apparatus for use with a microprocessor, said microprocessor processing a plurality of instructions each having associated data, the apparatus comprising: cache memory array for high speed memory accessing with the microprocessor; first processing means for executing preceding cache miss load instructions each having an associated data address that is not accessible by the cache memory array; and stalling means for temporarily preventing the microprocessor from executing a subsequent store instruction while one or more of the preceding cache miss load instructions are pending before the first processing means, the stalling means also for allowing the microprocessor to execute a subsequent load instruction while less than a predetermined number of the preceding cache miss load instructions are pending before the first processing means.

The present invention further includes a partially blocking cache apparatus as described above with storage means for indicating the number of the preceding cache miss load instructions that are pending before the first processing means, the storage means communicatively coupled to the stalling means and also communicatively coupled to the first processing means; and miss indicating means for generating a miss indication associated with each cache miss load instruction, the miss indicating means coupled to the storage means and wherein the first processing means comprises completion means for indicating to the storage means that a cache miss load instruction is completely processed by the first processing means and is therefore no longer pending before the first processing means.

The present invention further includes a partially blocking cache apparatus as described above wherein the storage means is a logical counter having an increment input and a decrement input and wherein the miss indicating means increments the logical counter upon each miss indication, the miss indicating means coupled to the increment input of the logical counter; and wherein the completion means decrements the logical counter upon each cache miss load instruction that is completely processed by the first processing means, the completion means coupled to the decrement input of the logical counter.

DETAILED DESCRIPTION OF THE INVENTION

Figure 1:
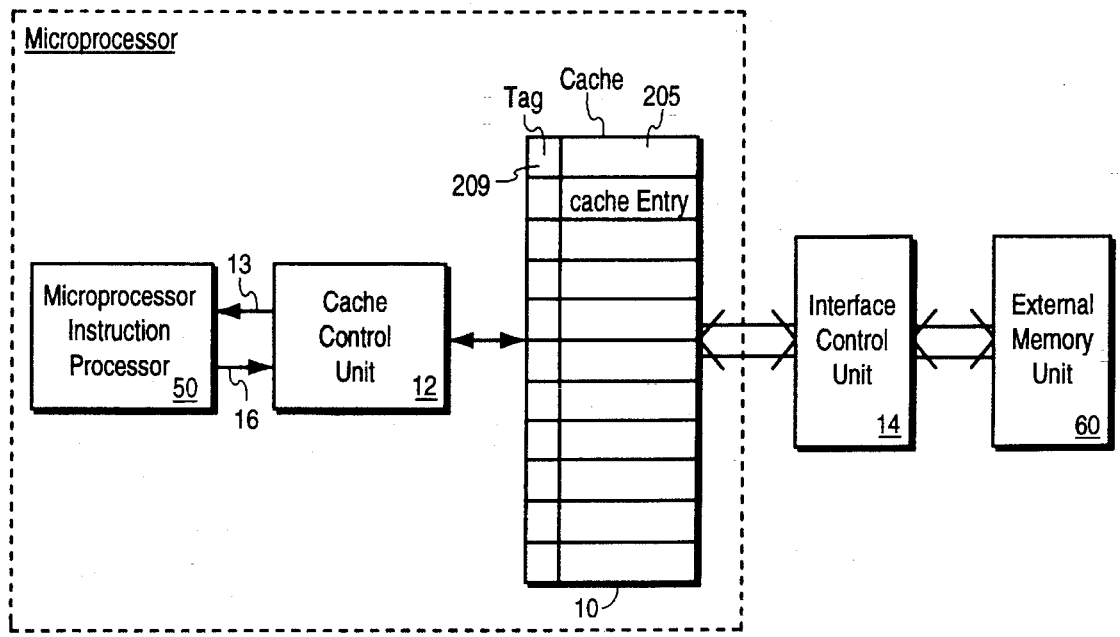
FIG. 1 is an illustration of a prior art system employing a prior art data cache system.

The present invention may operate within the environment of a conventional data cache unit of a microprocessor or a microprocessor system. It is appreciated that certain details of such a cache unit that are well known in the art of microprocessor technology and architecture are not described in detail as to not unnecessarily obscure the inventive features of the present invention. In the following detailed description of the present invention numerous specific details are set forth in order to provide a thorough understanding of the present invention. However, it will be obvious to one skilled in the art that the present invention may be practiced without these specific details. In other instances well known methods have not been described in detail as not to unnecessarily obscure the present invention.

The present invention includes an apparatus and method for a partially blocking data cache in a computer system. In the present invention, the instruction execution by the microprocessor is suspended for any store instruction which may follow a cache missed load instruction but allows execution of some subsequent load instructions following the cache missed load instruction. This suspension or "stalling" of the store instruction is performed until the data for each missed load instruction has been received from the external memory unit and no further missed load instructions are pending. The store instruction may then be executed. The purpose of stalling the store instruction when there are unfinished miss load instructions is to provide consistency within the memory structure and cache unit of computer system. For instance, if an unfinished load instruction is on the instruction queue, then the desired contents of the address for the load instruction have not yet been read from external memory. If a subsequent store instruction is allowed to execute before the missed load instruction completes then the store instruction may overwrite the desired data in the external memory (with the data associated with the store instruction at that same address location) before the data has a chance to be read from the external memory for the load instruction. Furthermore, the present invention cannot allow a store instruction to write data into the cache memory while outstanding loads are pending because a preceding yet incomplete and outstanding load instruction may overwrite the store data in the cache upon filling the cache with data from the external memory. Obviously, either result is undesirable as valid and desired data would be overwritten and lost causing data inconsistency.

The present invention advantageously allows efficient processing of the microprocessor by allowing multiple cacheable load instructions to be processed after the occurrence of a cache miss load instruction. Prior art systems block the data cache memory 55 and stall the microprocessor for any instructions subsequent to a cache miss associated with a load instruction until all the pending load instructions are completely processed and the external memory is accessed. However, the present invention advantageously does not degrade microprocessor performance by automatically stalling the instruction processor after a load instruction having a cache miss is encountered. Rather, the present invention allows processing of load instructions which follow a cache miss instruction.

One theory of operation of the present invention is that the data associated with a cache miss instruction and the data associated with a subsequent cache load instruction having data in the cache cannot be from the same data address. That is, the associated data of these load instructions must have separate address because one generated a cache miss while the other did not. Since the data addresses must be different there can be no data inconsistency by allowing these load instructions to operate out of order or in parallel. Therefore, the present invention allows the subsequent cacheable load instruction to execute while a preceding yet outstanding cache miss load instruction is still pending. If the subsequent load instruction was directed to the same data address as the outstanding load instruction then this subsequent instruction would also become outstanding (because it would generate a cache miss) and it would be sent to the BCL 56 for processing; and according the present invention this subsequent instruction would have to wait for the execution of the preceding outstanding load cache miss instruction by the BCL 56. Again, no data inconsistency would occur. But, in view of the reasons stated above, in no case may a store instruction be allowed to operate following a preceding and outstanding load miss.

Therefore, in an effort to increase processing efficiency and speed, the present invention allows a predetermined number of load instructions to execute while a preceding load miss is outstanding. In an effort to maintain data consistency, the present invention stalls each cacheable store instruction while any load misses are outstanding. The present invention achieves the above result by utilizing a minimum of hardware modifications to existing cache based computer systems and therefore offers an efficient apparatus and method for increasing the accessing speed of a computer system while insuring data consistency therein.

The present invention operates on a theory that some of the subsequent instructions executed by the microprocessor during an outstanding miss instruction do not require the result of the preceding missed instruction and are independent of the data associated with the missed instruction; also, some subsequent instructions may be allowed to operate without interfering with the result of the outstanding instruction and vise-versa. Therefore, these subsequent instructions should be allowed to execute completely (using the cache memory 55) although the missed instruction is not yet completed (due to the delay in accessing the external memory). Other instructions, if allowed to operate, either depend on the data related to the missed instructions or have the possibility of interfering with the result of the missed instruction or the miss instruction may interfere with the result of the subsequent instruction when the miss instruction is executed. These subsequent instructions must be suspended from execution until the accessing is complete for the missed instruction. If not, the cache data will not be consistent with the external memory. In these cases the present invention will suspend the microprocessor to halt the execution of the subsequent instruction in order to prevent inconsistencies within the data cache and external memory. The cache logic unit will generate a block signal to the microprocessor to block the execution of any subsequent instructions in situations that may cause data inconsistencies. Since the cache logic unit allows some subsequent instructions to operate and blocks the operation of others, it is referred to as a partially blocking data cache.

Figure 2:
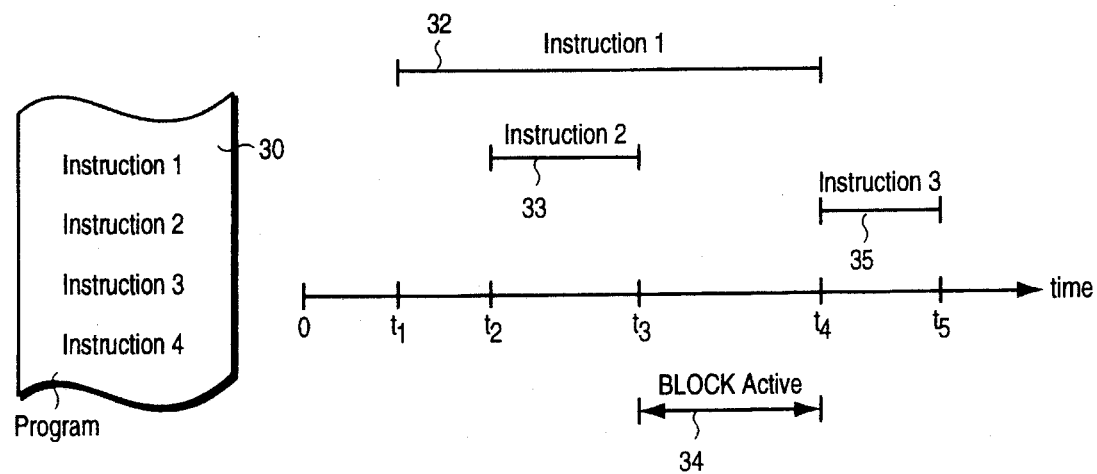
FIG. 2 illustrates a program instruction sequence and an associated timing diagram to illustrate the instruction sequences of the present invention, including a stalling period.

For example, FIG. 2 illustrates a timing diagram of a typical execution sequence of program code associated with program 30 used with the present invention. Microprocessor instructions 1, 2, 3, to n are executed by the microprocessor in sequence in performance of the program 30. The timing diagram illustrates the time line and each line indicates the processing period for each instruction. As can be seen, line 32 indicates that instruction 1 is executed first at t1. Instruction 1 is a cache miss instruction, that is, the data required for execution of instruction 1 is not found within the data cache. The line 32 represents the total period required to access and process the required address associated with the data of instruction 1, from t1 to t4. For illustration, instruction 1 is a load instruction of address x0. Instruction 2 is a load instruction of address x1 and the result of this instruction is not determinative on the result of instruction 1 nor will execution of instruction 2 interfere with execution of instruction 1 or vice-versa. Also, the data required for instruction 2 is located within the data cache. Therefore, instruction 2 is allowed to execute by the present invention at t2 to t3 during the time that instruction 1 is executing or still pending. As seen by line 33, the processing period for instruction 2 is very short in part due to the rapid accessing time of the data cache. The present invention advantageously allows instruction 2 to execute during the delay caused by instruction 1's external memory access.

Also at t3 of FIG. 2 the microprocessor attempts to execute instruction 3 which is a store instruction into address x0, however data cannot be stored within this address in external memory because the load instruction, instruction 1, is attempting to read data at this location in external memory and has not yet completed as of t3. If the store operation (instruction 3) where allowed to operate out of order (i.e., before the completion of instruction 1) it would overwrite the data of address x0 before the data was read by instruction 1. Also, data cannot be stored into the cache memory corresponding to this location by the store instruction before the precedent load instruction has completed. This is the case because the store instruction may store data within a cache location that becomes overwritten upon the completion of the precedent load instruction. In either case, the store instruction must be delayed by the present invention to maintain data consistency between external memory 60 and the cache memory 55. Therefore, as line 34 indicates, from t3 to t4 the execution of instruction 3 is suspended by the present invention until the desired data is accessed from x0 and instruction 1 is completed at t4. During the period indicated by line 34 the cache logic unit of the present invention is asserting a block signal which is received by the microprocessor unit to suspend execution of the subsequent instruction 3 while instruction 1 is executing. From t4 to t5 instruction 3 can then execute and the program 30 continues to instruction n, etc.

By allowing instruction 2 to operate during the operational period of instruction 1, the present invention has increased in processing inefficiency over total blocking cache systems. The present invention has also maintained data consistency by blocking execution of the store instruction until the outstanding load miss instruction 1 is complete. It should be noted that if another load miss instruction should be encountered before the outstanding load miss instruction (instruction 1) is complete, the new load miss instruction will not be blocked per se. It will be sent to the bus control logic 56 and placed onto a queue to be executed in turn after execution of instruction 1. As will be more fully discussed below, the bus control logic 56 has the capability to re-execute these instructions placed on its queue 57.

Overall System and Environment of the Present Invention

The overall environment, or system, in which the preferred embodiment operates is first described. In general, digital computer systems used by the preferred embodiment of the present invention as illustrated in block diagram format in FIG. 3A, comprise a bus 100 for communicating information between the elements of the system, a central processor, 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic disk and disk drive coupled with the bus 100 for storing program information and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to the processor 101.

It should be noted that some environments of the present invention may contain all or merely a portion of the above components. For example, if the present invention was implemented within a control device for an advanced photocopier or a laser printer, the input device would be a keyboard at the copier control or a signal input for the laser printer. The display would be the common LCD display of the photocopier to the user or an LED indicator light. Of course, RAM and ROM devices are present within even simple systems. The signal generation device would include the logic required to detect and indicate copier/printer malfunctions, etc. It is also appreciated that throughout this discussion, reference may be made to data in a memory or the processing of data; it should be understood that the term "data" means both data that may be processed by an instruction as well as the instruction itself, i.e., the bytes that comprise a particular opcode. Therefore, data should not be construed as merely representing program data but also as representing program instructions.

Figure 3A:
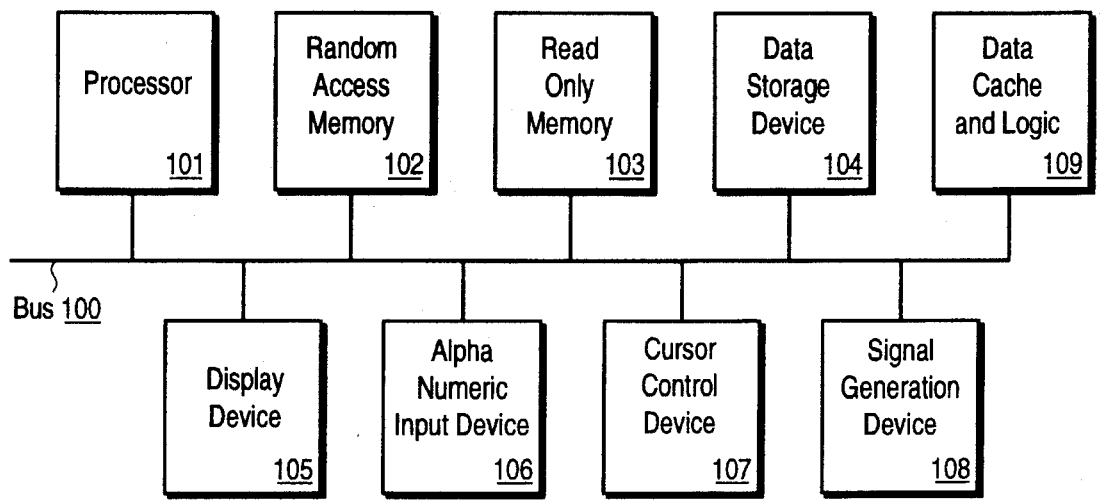
FIG. 3A and FIG. 3B illustrates block diagrams of two overall system embodiments of the present invention data cache unit.

Referring still to FIG. 3A, the display device 105 utilized with the computer system and the present invention may be a liquid crystal device, cathode ray tube, a simple LED indicator light, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices, including those uniquely developed for the disabled. In the discussions regarding cursor movement and/or activation within the preferred embodiment, it is to be assumed that the input cursor directing device or push button may consist any of those described above and specifically is not limited to the mouse cursor device. Some systems encompassing the present invention may not include a cursor control device.

Referring to FIG. 3A, the data cache memory 55 and associated data cache unit 52 and bus control unit of one embodiment of the present invention are logically associated with block 109 and interface to the bus 100 by way of the bus control logic. The data cache unit 52 interfaces with the processor 101 via bus 100. The bus control logic 56 interfaces with external memory units 102 and 103 via bus 100. It is appreciated that although FIG. 3A illustrates the data cache memory and associated data cache unit and bus control unit as separate from the microprocessor, alternative embodiments of the present invention integrate these logical units together with the microprocessor 101. To this extent, the diagram illustrated in FIG. 3A should be construed as a functional block diagram and not necessarily a structural block diagram representing the present invention.

Figure 3B:
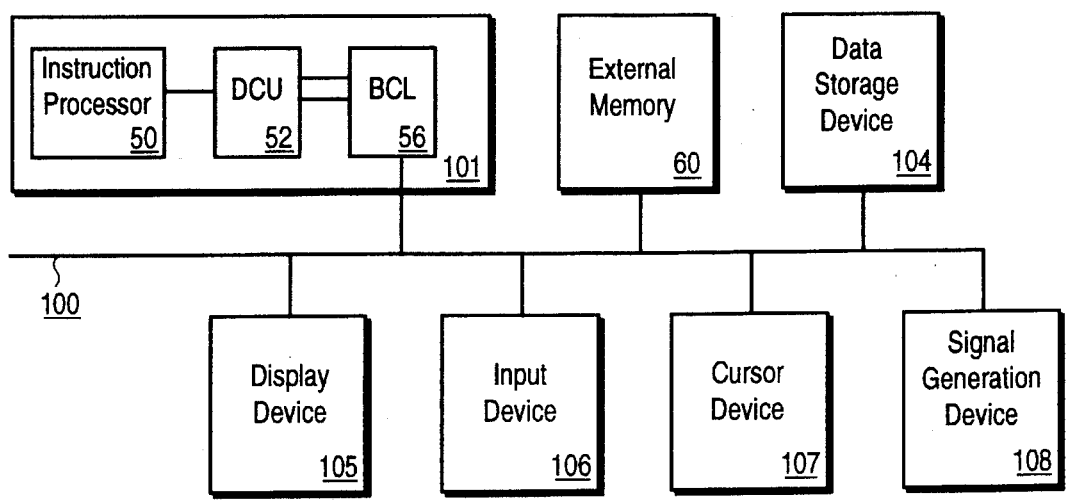

FIG. 3B illustrates the preferred embodiment of the present invention which locates the data cache unit 52 and the bus control logic 56 within microprocessor 101. The bus control logic 56 is interfaced with the bus 100 and with the data cache unit 52. External memory 60 is shown interfaced with the bus 100. External memory may be composed of RAM 102 or ROM 103 or both. This memory 60 is "external" in so far as it is external to the microprocessor unit 101. It is appreciated that also located within microprocessor 101 is an instruction processor that executes the instructions of the program code; this instruction processor is interfaced with the DCU 52. The other components of FIG. 3B are analogous to those described with respect to FIG. 3A and reference is called those discussions above.

Overall Design of the Preferred Embodiment of the Present Invention

Figure 4:
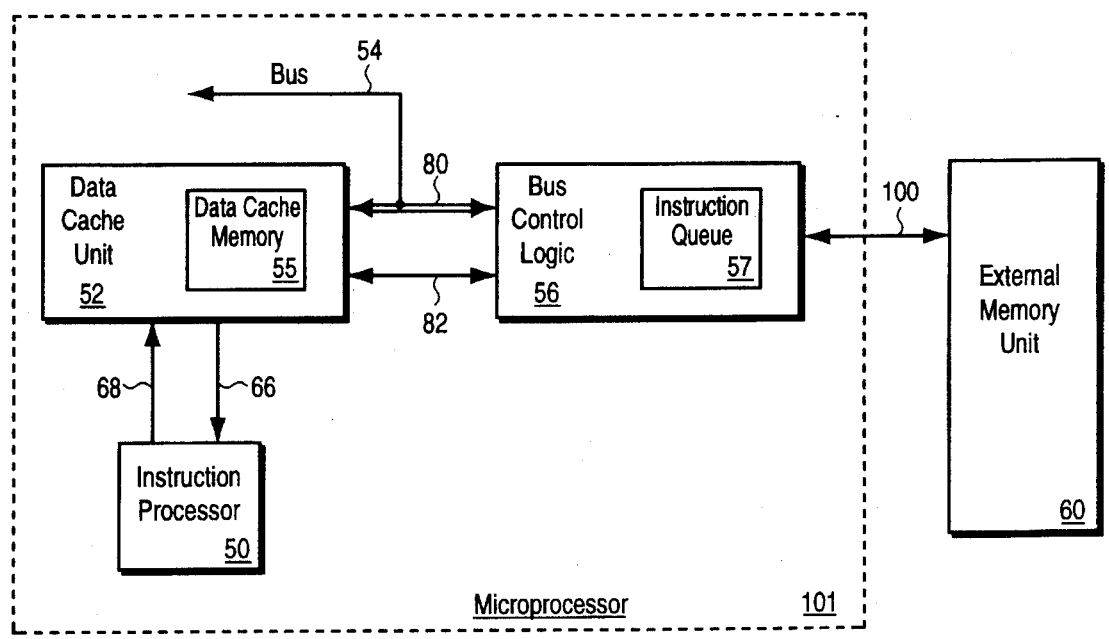
FIG. 4 is a general block diagram of the present invention illustrating the data cache unit, the bus control logic (both with the microprocessor) and the external memory.

FIG. 4 illustrates a block diagram of the components of the preferred embodiment of the present invention. Aside from the external memory block 60, the elements of the preferred embodiment of the present invention are located within the microprocessor block 101 as illustrated by the dashed line. Block 52 is the Data Cache Unit or DCU which controls the accessing and processing of the data cache memory 55 which is included within the DCU. The DCU 52 interfaces with the instruction processor 50 unit of the microprocessor via interface lines 68 and 66. The instruction processor 50 is the logical portion of the microprocessor that controls the execution of instructions within the microprocessor 101. When a stall or block signal is generated by the DCU 52, the instruction processor stalls or halts execution of subsequent instructions while the cache blocking signal 66 is asserted. Within the interface line 66 is the blocking signal which will suspend execution of subsequent instructions upon the block signal asserted. Interface 68 carries an identification of the currently executed instructions which are fed to the DCU 52 by the microprocessor instruction processor 50. The DCU 52 requires this information since it will respond differently (i.e., stall or not stall) based on different instruction types.

The DCU 52 is coupled to internal bus 54 (which is not the bus 100) and to the Bus Control Logic (BCL or also called Bus Control Unit) 56 via interface lines 80 and 82. Control signals and other signals, which will be discussed more fully below, are transmitted between the BCL 56 and the DCU 52. When the instruction decoder 200 (of FIG. 5) is located off of the DCU 52 then the load and store signals 300 and 310 are communicated over internal bus 54. The external memory 60 (which may be composed of RAM 102 or ROM 103 or both) is coupled to the BCL 56 via external bus 100 but not directly coupled to the DCU 52. The DCU 52 will determine when a block signal should be generated to suspend execution of subsequent instructions by the microprocessor's instruction processor 50. The DCU 52 will also determine whether or not a cache miss occurred associated with a load instruction. The BCL 56, on the other hand, re-executes the cache miss load instructions. The BCL 56 will also indicate when an outstanding instruction (cache miss) has been completely executed. An instruction queue 57 is located within the BCL 56 for holding multiple pending cache miss instructions.

The DCU 52 is a one kilo byte, direct mapped, write through cache unit. When the DCU 52 does not have the data within cache memory 55 that a load instruction is asking for, a cache miss occurs and the BCL 56 will be notified to fetch the data from external memory 60. As the data returns from external memory 60, the BCL 56 instructs the DCU 52 to access the obtained data and update or replace its data cache entry within the data cache memory 55. The DCU replacement policy supports up to 16 bytes (quad word or 128 bits) replacement in a multiple of 4 bytes quantity for load instructions. However, for store instructions, it can support up to 16 bytes replacement down to a multiple of 1 byte quantity. In other words, the maximum replacement line size of the DCU is 16 bytes in quantity. The DCU 52 is considered a single cycle memory co-processor which returns data for normal load and store instructions in one clock if the data is already available in the cache. The DCU 52 is able to handle bit endian as well as little endian memory accesses.

It is appreciated that the BCL 56 assumes that every load instruction issued by the instruction decoder 200 is going to be processed by the DCU 52. However, the BCL 56 does trap all the necessary information associated with every load instruction so that the BCL 56 can itself (not the instruction decoder 200) reissue the load instruction that misses the DCU (cache) and execute the load instruction. Therefore, each time a load instruction misses the cache there will one clock cycle loss of time. It is further appreciated that the DCU 52 generates a blocking signal over line 66 in order to stall or halt processing of the microprocessor unit 50 instruction processor when a store instruction follows a pending load instruction. Most microprocessors are equipped with a halt signal pin or a stall opcode which allows the microprocessor's clock to cycle without any instruction processing performed by the microprocessor instruction processor 50. That is, for a given time period the instruction processing capability of the microprocessor is temporarily "frozen" allowing the BCL 56 just enough time to access the external memory to process the pending load instruction or instructions, as the case may be. Such methods and apparatus for stalling a microprocessor are well known in the art of microprocessor structure and technology and therefore are not described herein as to not obscure the present invention. It is noted that the present invention may advantageously utilize any of the above well known microprocessor stall or halt methods.

Figure 5:
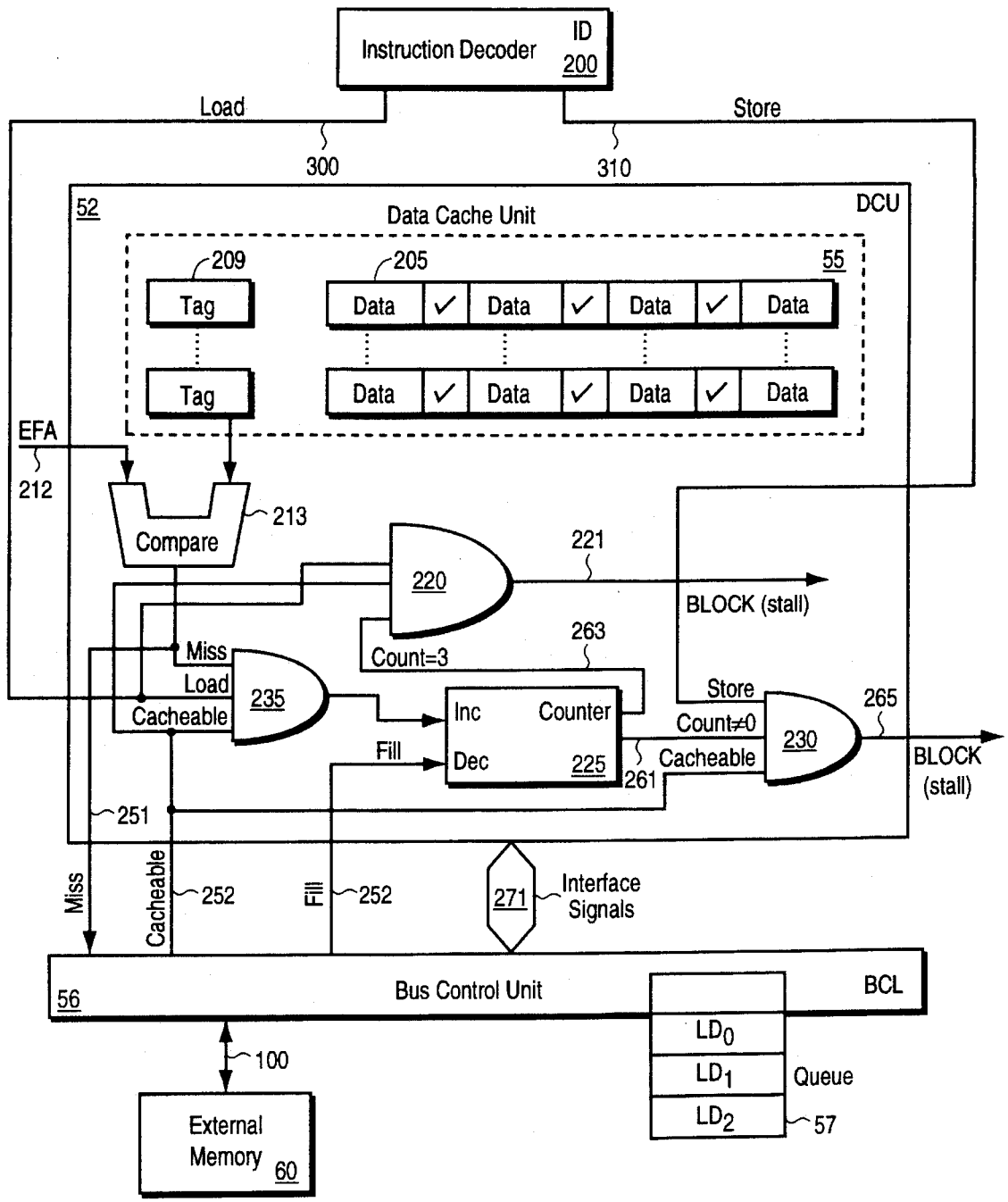
FIG. 5 is a detailed block diagram of the data cache unit and other components of the present invention.

FIG. 5 illustrates the components of the present invention in more detail. The elements of the Data Cache Unit 52 are illustrated in detail and an Instruction Decoder 200 is illustrated coupled to the DCU 52. The Bus Control Logic (BCL) 56 is also illustrated coupled to the DCU 52 and the external memory 60. The BCL 56 is also a cache miss processing unit. The instruction decoder 200 is located within the microprocessor 101 unit and is responsible for decoding the instructions executed by the microprocessor and determines, among other results, that the current instruction is either a load instruction (via line 300) or a store instruction (via line 310). Although illustrated as separate from the Data Cache Unit 52, the instruction decoder could be implemented within the DCU 52. Further, the DCU 52 could be implemented with a separate and special purpose (dedicated) instruction decoder for the purpose of indicating a load or a store instruction. Such implementations would merely be a matter of design selection and are within the spirit and scope of the present invention.

The instruction decoder 200 is coupled to the logic circuits of the data cache unit 52 via line 300 which indicates that the present instruction from the microprocessor instruction processor 50 is a load instruction. Line 310 indicates that the present instruction from the microprocessor instruction processor 50 is a store instruction. The decode process of the present invention may be accomplished by instruction decoder 200 by any number of the well known instruction decode methods available and utilized by microprocessor technology. Typically each instruction has an associated unique opcode to identify the instruction and instruction type. The instruction decoder will analyze the opcode to indicate either a load or a store instruction by asserting lines 300 and 310 respectively. When the current instruction is decoded, the effective address of the data associated with the instruction is input over line 212 to a comparator circuit 213. The comparator circuit of the data cache unit 52 is specially designed to cycle through each tag 209 of the data cache memory unit 55 in order to locate an address match between the effective address of the data 212 and one tag 209 of the cache memory 55. The comparator circuit 213 compares the upper bits of the effective address of the data to the tag data in an effort to locate a match. The effective address 212 is fed to one input of the comparator 213 while the other input sequentially scans the tag entries 209 for a match. If a match is not found, the present invention generates a miss signal 251 over the output of the compare logic 213. This indicates that the data address location associated with the present instruction is not within the cache memory unit 55 and must be accessed via the external memory 60 by the BCL. The BCL 56 must therefore re-execute the load instruction using external memory 60. This miss signal is fed into one of the inputs of the logical AND gate 235. The load signal 300 is also fed into the 235 gate as well as a cacheable signal 252 generated from the bus control unit 56.

Referring to FIG. 5, while the above occurs, the bus control unit 56 analyzes the effective address of the current data address and determines if this address is cacheable or not, that is, the BCL 56 determines if the cache memory 55 is able to have a corresponding location for the memory block associated with the effective address 212. If the effective address is not cacheable then the present invention does not block the cache with regard this effective address. Cacheability does not mean that the cache memory 55 actually contains the effective address location within the memory 55; rather, cacheability only refers the fact that the cache memory 55 is able to provide accessing for the effective address of the data at some point in time. For instance, some portions of external memory will never have a corresponding cache memory location and these areas are not cacheable and as a result there is no need for the present invention to block the cache 55 with regard to these locations. In other words, there can be no cache data inconsistency associated with these memory addresses since no cache functions are performed. When a cacheable effective address 212 is present the cacheability signal 252 will be asserted. Therefore, the AND gate 235 of the present invention will become asserted and generate a signal at its output when all three conditions are met: 1) there is a cache miss associated with the present instruction; and 2) the present instruction is a load instruction; and finally 3) the load instruction has an associated effective address that is cacheable.

Upon the above conditions (cacheable load with cache miss), the AND gate 235 of the present invention will pulse to increment the load pending counter 225. The output of the AND gate 235 is coupled to the increment input of the load pending counter 225. The load pending counter 225 keeps track of the number of the load miss instructions that are pending before the bus control logic 56 for re-execution but have not yet completely executed. In other words, the load pending counter records the number of load instructions on the queue 57. The load pending counter 225 is a two bit counter and counts 0, 1, 2, and 3; note that the load pending counter 225 cannot overflow because the maximum allowed outstanding loads on the BCL queue 57 is three. A special output 261 of the load pending counter 225 is fed to one of the inputs of AND gate 230. The output 261 indicates when the count of the counter is of a nonzero value. It should be appreciated that upon the occurrence of a miss, the BCL 56 receives the load instruction and will re-execute the instruction using external memory 60. If the BCL 56 already has outstanding loads to re-execute then the current load cache miss instruction will be delayed (i.e., placed on an empty slot of the queue 57).

Assume that a cacheable store instruction is indicated by instruction decoder 200 via line 310 being asserted; assume also that this condition exists subsequent to a load cache miss that is outstanding. The output 265 of AND gate 230 will generate the blocking signal which becomes asserted upon any subsequent cacheable store instructions which occur while an outstanding. cache miss load instruction is on the BCL queue 57 as indicated by the load pending counter 225. The counter output 261 of the present invention is asserted whenever the load pending counter 225 currently holds a count that is not equal to zero. This can be implemented through logic by feeding the output bits of the two bit counter into an OR gate and taking the OR gate output as signal 261. Thus, whenever one of the bits of the counter is nonzero the OR gate will generate an asserted signal. The line 310 which indicates a store instruction is also fed into one of the inputs of the AND gate 230. The last input of the AND gate 230 receives the cacheable signal 252 which indicates that the associated memory address with the current instruction may reside in cache memory 55. If line 252 were asserted the store instruction would be cacheable.

Referring to FIG. 5, AND gate 230 of the present invention will generate a blocking signal at line 265 whenever a cacheable store instruction is present and the load pending counter 225 is nonzero indicating that there are outstanding load instructions (or a single outstanding load instruction) on the BCL queue having memory access operations to the external memory 60 that have not yet returned. The 265 signal is fed into the interface 66 (of FIG. 4) and is received by the instruction processor 50 of the microprocessor 101. The 265 signal causes the microprocessor to stall or halt current execution of the cacheable store instruction until each outstanding load miss instruction on the BCL queue has been removed as indicated by the load pending counter 225. If a cache miss load instruction is encountered and the queue 57 is not full, then the load instruction is placed onto the queue 57. Note that queue 57 is initially set to zero on system start-up.

The BCL 56 processes the outstanding load instructions stored on the queue 57 in a first come first serve basis (i.e., first in first out). Each cache miss load instruction arriving at the BCL is placed by the present invention on an available location within the queue 57 and the BCL then re-executes the load instruction and processes the logic required to access the external memory 60 via the external bus 100. At the time the BCL 56 becomes aware of the cache miss load instruction and places the instruction and associated memory address on the queue 57, the load pending counter 225 is updated to indicate an outstanding load. While the first outstanding load is being processed other load instructions may be placed on the queue 57. When the required data returns from the external memory 60 via bus 100, the BCL 56 indicates to the data cache unit 52 that the data is available for immediate fill into the cache memory 55 at a location determined by the effective address of the desired data and tagged as such by tag 209. The BCL 56 indicates the cache fill condition by asserting signal 253 indicating that a load miss instruction has completed and also that the data associated with that instruction has been fetched from external memory 60 and is currently available.

When fill signal 253 is indicated, the present invention updates the data 205 of cache memory 55 by the data returning from the external memory 60 at the proper tag location. Also, the fill signal 253 is fed into the decrement input of load pending counter 225 to decrement the count of the cache miss load instructions pending. This is so because when the fill condition is entered the currently processed cache miss load instruction (from the BCL) is finished processing and is therefore no longer on the queue 57 and therefore one less outstanding load is present. Therefore, the present invention increments the two bit load pending counter 225 each time a cacheable load miss occurs and decrements the load pending counter 225 each time a fill condition is indicated by the BCL 56 which represents the completion of an outstanding load instruction. It is appreciated that other interface signals 271, not necessary for the understanding of the present invention, are present between the BCL 56 and the DCU 52. These signals are not explained in detail as to no unnecessarily obscure the advantageous aspects of the present invention.

It is appreciated that a blocking signal is generated by the present invention also when a load instruction is issued but there are already the maximum number (3) of outstanding load miss instructions on the BCL queue 57. It is also appreciated that a number of embodiments may be employed to accomplish this task. One embodiment of the present invention is to have the BCL 52 indicate a signal when the queue 57 is full and have the data cache unit 52 respond to this signal whenever another cache miss load instruction is encountered to block the instruction processor 50. An other embodiment, the preferred embodiment of the present invention, as illustrated by FIG. 5 is implemented with logic on the DCU 52 and utilizes the load pending counter 225. In more detail, AND gate 220 receives input from signal 252 to indicate that the current instruction is cacheable. The AND gate 220 also receives an input from signal 300 to indicate that a load instruction has been encountered by the instruction decoder 200. Further, the last input to the AND gate 220 is signal 263 originating from the load pending counter 225.

Signal 263 indicates when the load pending counter 225 currently holds a count of 3 indicating that the queue 57 is currently full. This signal may be implemented by checking both bits of the load pending counter 225 and supplying them to an AND gate which will assert and output when both bits are logical "1" which indicates a three in binary. Gate 220 will generate a block signal on line 221 whenever the counter holds a value of three and a cacheable load instruction is encountered. Signal 221, like signal 265 is fed to the instruction processor 50 via line 66 and instructs the microprocessor to stall or halt execution of the current load instruction. The microprocessor 50 must halt on this condition because no further load miss instructions can be placed on the BCL queue 57 until a slot is opened. When the first outstanding load instruction on the BCL queue 57 is complete, a cache fill instruction will be generated over line 253 from the BCL 56 and the cache memory 55 of the present invention will be updated with the data from the external memory 60. The load pending counter 225 will then be decremented by signal 253 and the blocking signal at 221 will no longer be asserted by AND gate 220. At this time, the stalled load miss instruction will be executed by the present invention. If the load instruction generates a cache miss then as described above, the present invention will placed it onto the queue 57 of the BCL 56 and the load pending counter 225 will be incremented.

It is appreciated that the blocking signals generated at line 221 and line 265 are temporary. Blocking signal at line 265 is deasserted upon the count of the load pending counter 225 reaching zero. Also the blocking signal at line 221 is deasserted upon the counter reaching a value of 0, 1, or 2. As can be seen from the above, a partially blocking data cache system has been described which is implemented with a two bit load pending counter, a halt signal and relatively modest external implementation logic. The advantage of this type of circuitry is that easy modifications of existing data cache units is possible using the advanced technology offered by the present invention. The present invention insures data integrity and consistency by blocking store instructions, with signal 265, that follow outstanding cache miss load instructions. Further, the present invention is efficient in that it allows multiple cacheable load instructions to execute within the cache memory 55 following a load instruction having a cache miss.

FIG. 5 also illustrates the Bus Control Logic 56 (BCL) which is also called the Bus Control Unit. As shown, the BCL 56 interfaces with the DCU 52 via miss signal 251, the cacheable signal 252, the cache fill signal 253 and various other interface signals 271. Within the BCL 56 is an instruction queue 57 which stores the outstanding cache miss instructions (loads) that are still pending execution and access to the external memory 60. The BCL 56 re-executes each instruction within the queue 57 in so far as these instructions were first attempted to be executed in the DCU 52 but a cache miss was generated by comparator 213. The BCL 56 executes each instruction in the queue 57 in a first in first out sequence by accessing the external memory 60 to retrieve the data associated with the effective address of these instructions. Once execution is complete by the BCL 56, the fill instruction is asserted allowing the data to be put into the cache memory 55. The counter 255 is then decremented and the queue 57 is updated (i.e., each entry is moved up in line and a vacant entry is available at the end of the queue). As shown, the queue 57 is only three instructions deep and can hold only three pending cache miss instructions. Not all locations of the external memory are cacheable. Those locations not cacheable are stored in a directory table within the BCL 56. When the effective address of an instruction 212 corresponds to a noncacheable location within the external memory, as indicated by the directory, the cacheable signal 252 is deasserted. Likewise, when the effective address of an instruction 212 corresponds to a cacheable location within the external memory, as indicated by the directory, the cacheable signal 252 is asserted by the BCL 56.

Operation of the Preferred Embodiment of the Present Invention

Figure 6:
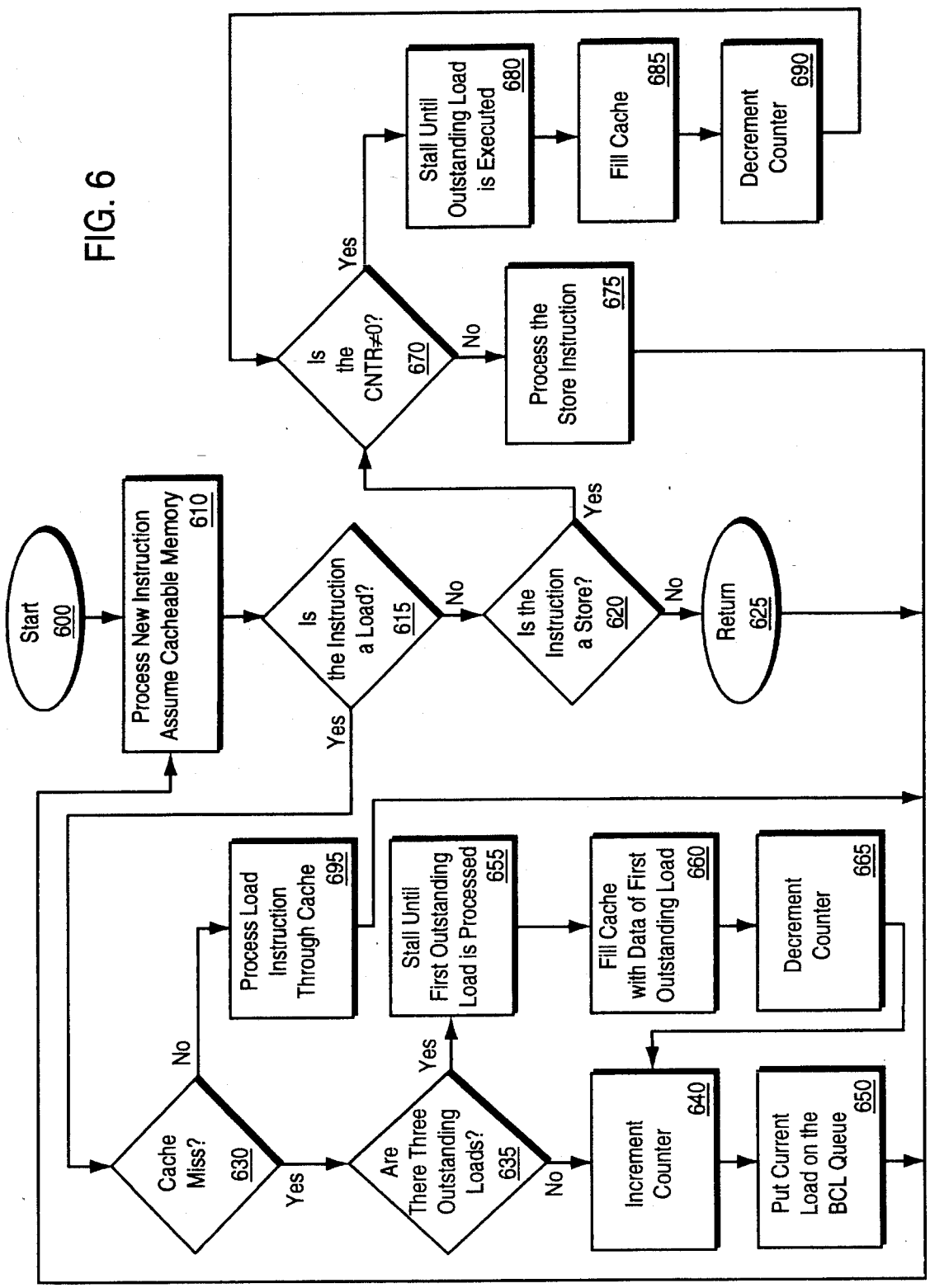
FIG. 6 is a flow diagram of the major processing functions of the present invention.

The major functions of the preferred embodiment of the present invention operate according the flow diagram illustrated in the flow diagram of FIG. 6. The present invention acts to stall the microprocessor's instruction processor whenever: (1) a store instruction is encountered and there are still outstanding cacheable load miss instructions on the BCL queue 57 which have not yet been fully executed by the BCL 56; or (2) a load instruction is encountered but there are already three outstanding cacheable load miss instructions on the BCL queue 57 which have not yet been fully executed by the BCL 56. An outstanding load instruction on the queue will not be fully executed until the BCL 56 receives the required data from the external memory 60 and issues a cache fill signal 253. To allow a store instruction to execute before the data associated with an outstanding load is retrieved from external memory may cause desired data to become overwritten before the load instruction is processed or the load may overwrite desired store data in the cache memory 55. The status and contents of the BCL queue 57 are determined by a load pending counter 225 within the DCU 52 that indicates the number of outstanding cacheable load miss instructions that are located on the queue 57.

As shown in FIG. 6, at block 600 the functions of the present invention begin. The instruction processor 50 presents the next microprocessor instruction at block 610. The present invention data cache unit only processes those instructions having associated cacheable memory addresses because those instructions with noncacheable data addresses do not create data inconsistencies between external memory 60 and cache memory 55. Therefore, throughout this discussion it is assumed that processed instructions involve cacheable memory addresses. The instruction decoder 200 decodes the current microprocessor instruction from the instruction processor 50. The instruction decoded result is tested at blocks 615 and block 620 to determine the instruction type. Block 615 of the present invention tests whether the instruction was a load instruction by examining the opcode and indicates the result of the test by employing signal 300 (of FIG. 5). If the instruction is a load instruction (and assumed cacheable) then the present invention checks to see if the address of the requested data is found within the cache memory 55 at Block 630. The selected bits of the effective address 212 of the data associated with the cacheable load instruction are compared to each of the tags 209 of the cache memory 55 in order to determine if the data resides within the data 205 of the cache memory 55. The comparison is accomplished via comparator 213. If the desired address 212 is found (a cache hit) within the cache memory 55 then the data 205 is read from the cache memory 55 and the load instruction may execute completely from the cache memory (and DCU 52) without access to the external memory and without re-execution by the BCL 56; the cache hit load instruction is processed through the cache at block 695. In this case, no miss was found and the processing returns to block 610 to receive another instruction from the decoder after processing of block 695.

It is appreciated that block 695 increases processor speed and efficiency by allowing cacheable load instructions to operate via the cache memory 55 while preceding outstanding load instructions which have caused cache misses are still within the BCL 56. During the delay period while data is being accessed from external memory for these outstanding load instructions the present invention allows the microprocessor 101 to execute certain load instructions through the cache memory 55 via block 695. For instance, even if two preceding cache miss instructions were on queue 57, block 695 is still allowed to process cache hit load instructions while the above cache miss instructions remain pending in the BCL 56.

If the comparison unit 213 does not indicate that the desired memory address 212 is present within the cache memory 55, then a miss condition occurs which is signaled by the comparison unit 213 over line 251. In this case the address must be retrieved from the external memory 60 and the load instruction must be re-executed by the BCL 56. The present invention proceeds to block 635 and the load pending counter 225 is checked or the BCL queue 57 is checked to see if there are three outstanding cache miss load instructions already. If there are less than three outstanding load instructions on the queue then the load pending counter 225 is incremented at block 640 by asserting the output of AND gate 235 and the current load instruction (which generated the most recent cache miss) is placed at the end of the BCL queue 57 at block 650 so that the BCL 56 may sequentially process this load instruction (in time) and obtain the required data from the external memory 60. After the load instruction is placed on the queue 57 the present invention returns to block 610 to process the next instruction from the microprocessor instruction processor 50 which is decoded by instruction decoder 200. It should be noted that if no outstanding load instructions are within the queue 57 upon the current cache miss load instruction the BCL 56 may re-execute the load instruction at once. While the BCL 56 is executing this load instruction, subsequent cache miss load instructions will be delayed (i.e., placed on the queue) until the presently processed instruction is completed by the BCL 56.

Referring still to FIG. 6, if there are already three outstanding load instructions waiting on the BCL queue then no more load instructions may be placed on the BCL queue. Block 635 tests if there are already three pending load instructions, and if so, the present invention goes to block 655. At block 655 the present invention stalls the current load instruction until the first load instruction on the BCL queue is completely executed and the external memory is accessed; during this period the cache is blocked and signal 221 is asserted. When the first outstanding instruction is completely executed, the BCL asserts a cache fill signal 253 at block 660 to indicate to the data cache unit 52 that the data associated with the first outstanding load instruction may be placed or replaced within the data cache memory 55. The cache memory 55 is then updated accordingly and the first outstanding load instruction is executed. At block 660 the first outstanding load instruction taken off of the BCL queue by the present invention and a space on the queue is thereby made available. The load pending counter 225 is decremented at block 665 by fill signal 253 to indicate that an outstanding load has been taken off of the BCL queue. The processing then continues to block 640 where the current load instruction is processed. Since it has been determined that the current load instruction is a cache miss, the load pending counter 225 is incremented and the current load instruction is the placed into the BCL queue 57 into the last or third position by block 650. Processing then returns to process the next instruction at block 610.

At block 615 if the instruction decoded by the instruction decoder 200 is not a load instruction the processing continues to block 620 where the present invention checks if a signal on line 310 indicates that the current instruction is a store instruction. If the instruction is not a store instruction and not a load instruction, then the present invention is not applicable to the situation and the present invention returns at block 625 to end current processing and the flow enters again at block 610 to process another microprocessor instruction. If the current instruction is a store instruction then processing continues from block 620 to block 670. At block 670 the present invention checks to see if the load pending counter 225 is nonzero. If the counter 225 is zero then no cacheable loads are outstanding on the BCL queue 57 and the cacheable store instruction may be executed by block 675; in this case the cache is not blocked. Next, the processing continues to block 610 for the next instruction.

Referring to FIG. 6, if the counter is nonzero at block 670 then at least one outstanding load instruction with a cache miss is pending. According to the present invention, the store instruction must not be allowed to execute with the cache while outstanding load instructions are pending in order to maintain data consistency. The present invention cannot allow data to be written into main memory by a store instruction because such data may overwrite desired data of a preceding and incomplete load instruction. Furthermore, the present invention cannot allow a store instruction to write data into the cache because a preceding yet incomplete and outstanding load instruction may overwrite the store data upon execution of the load instruction. Therefore, at block 680 the DCU issues a command, via signal 221, to block execution of the current store instruction. At this point the data cache memory 55 is blocked by the present invention and the present invention stalls the microprocessor instruction processor 50. The signal is asserted at line 221 and driven to the microprocessor instruction processor 50 until the load pending counter 225 is decremented to zero. Upon the completion of each outstanding load instruction at block 685 a fill code is generated over line 253 so that the data retrieved from the external memory 60 associated with the outstanding load can be placed or replaced into the data cache memory 55.

For each outstanding load that is fully executed by the BCL 56 and upon the BCL retrieving its associated data from the external memory 60, the load pending counter 225 is decremented and the instruction is removed from the BCL queue 57; this occurs at block 690 when the fill signal is asserted. The present invention then cycles to block 670. Eventually, all of the outstanding loads will have completed and the load pending counter 225 will be decremented to zero. At this time, block 670 will indicate that the load pending counter 225 is zero and the current store instruction will no longer be stalled by the present invention and the blocking pulse at 221 will not be asserted. The microprocessor is therefore no longer stalled and free to execute the store instruction. Then the store instruction may be processed and data may be stored in the cache or in the external memory 60 at block 675. After the store instruction is processed the present invention returns to block 610 for the next instruction from the microprocessor.

It can be seen from the above that some instructions are suspended from execution by a blocking signal generated at lines 265 and 221 and other instructions are merely delayed from execution by being placed onto the BCL queue 57. Load instructions whose data is found in the cache may generally execute during the period of an outstanding load instruction that generated a cache miss. Load instructions whose data is not found in the cache are placed onto the BCL queue 57 for eventual sequential execution by the BCL 56. Store instructions following an outstanding load instruction in the BCL that generated a cache miss will be suspended from execution until all outstanding load instructions have been processed. Lastly, if the BCL queue 57 is filled then a subsequent load instruction will be blocked (suspended). As can be seen, the-present invention data cache unit advantageously processes successive loads even though a previous load miss was encountered.

It is appreciated that the present invention operates advantageously within the 80960CF microprocessor available from Intel Corporation of Santa Clara, Calif. and will operate equally advantageously with any microprocessor and data cache unit having similar characteristics. The present invention operates advantageously within the above microprocessor because of the large number of registers contained within this microprocessor. As a result of the large number of registers, relatively few memory stores are required as a percentage of the overall instructions executed because registers can be used for temporary storage. Since multiple load misses can be accepted without a blocking signal issuance, the most frequent occurrence of a microprocessor stall is when a store instruction follows an outstanding load instruction that missed the cache. Therefore, since the memory store instructions are executed relatively infrequently, the overall microprocessor performance is not degraded as a result of the stall signal. Furthermore, processing efficiency is improved using the present invention by allowing execution of multiple load instructions after the occurrence of a load instruction cache miss.

The preferred embodiment of the present invention, a partially blocking data cache memory and data cache unit implemented with relatively modest hardware modifications over existing cache designs that blocks subsequent store instructions if there are outstanding load misses while allowing successive loads through the cache even though a pervious load miss was encountered is thus described. While the present invention has been described in one particular embodiment, it should be appreciated that the present invention should not be construed as limited by such embodiment, but rather construed according to the below claims.

What is claimed is:

1. A cache memory apparatus for use with a microprocessor that processes a plurality of instructions having associated data, said apparatus comprising:

cache memory means for providing high speed memory cache operations with said microprocessor;

miss indicating means for generating a miss indication associated with each instruction of said plurality of instructions having an associated data address which is not accessible by said cache memory means, said each instruction called a cache miss instruction; and selecting means for temporarily blocking said microprocessor from processing a first instruction type of said plurality of instructions that follows said miss indication from said miss indicating means, said selecting means also for allowing processing of a second instruction type of said plurality of instructions that follows said miss indication from said miss indicating means, said selecting means communicatively coupled to said miss indicating means.

2. A cache memory apparatus as described in claim 1 wherein said first instruction type is a store instruction type.

3. A cache memory apparatus as described in claim 2 wherein said second instruction type is a load instruction type.

4. A cache memory apparatus as described in claim 1 further comprising:

external memory means for storage and retrieval of information compatible with said cache memory means; and cache miss processing means for processing each cache miss instruction by accessing said external memory means.

5. A cache memory apparatus as described in claim 4 further comprising means for signaling whether said cache miss processing means is required to process any cache miss instruction.

6. A cache memory apparatus as described in claim 5 wherein said means for signaling comprises counting means for incrementing on each of said miss indication generated by said miss indication means and said counting means for decrementing upon execution completion of each of said cache miss instruction processed by said cache miss processing means.

7. A cache memory apparatus as described in claim 4 wherein said selecting means temporarily blocks said microprocessor from executing said first instruction type while said cache miss processing means is required to process any cache miss instruction 8. A cache memory apparatus as described in claim 1 further comprising:

external memory means for storage and retrieval of information compatible with said cache memory means; and cache miss processing means for processing said each cache miss instruction by accessing said external memory means, said cache miss processing means further comprising a queue for storing pending cache miss instructions.

9. A cache memory apparatus as described in claim 8 wherein said first instruction type is a load instruction and wherein said selecting means blocks said microprocessor from processing said load instruction if said queue is full and wherein said second instruction type is also a load instruction and said selecting means does not block said microprocessor from processing said load instruction if said queue is not full.

10. A cache memory apparatus as described in claim 6 wherein said cache memory means comprises a data cache memory array of approximately 1k bytes and wherein said counting means is a two bit counter.

11. A cache apparatus for use with a microprocessor, said microprocessor processing a plurality of instructions each having associated data, said apparatus comprising:

cache memory means for high speed data storage and retrieval for said microprocessor;

first processing means for executing cache miss instructions each having an associated data address that is not accessible by said cache memory means; and stalling means for temporarily preventing said microprocessor from executing a first instruction type while one or more of said cache miss instructions are pending before said first processing means, said stalling means also for allowing said microprocessor to execute a second instruction type while one or more of said cache miss instructions are pending before said first processing means.

12. A cache apparatus as described in claim 11 further comprising storage means for indicating if any of said cache miss instructions are pending before said first processing means, said storage means communicatively coupled to said stalling means and also communicatively coupled to said first processing means.

13. A cache apparatus as described in claim 11 wherein said first instruction type is a store instruction.

14. A cache apparatus as described in claim 11 wherein said second instruction type is a load instruction.

15. A cache apparatus as described in claim 11 wherein said first instruction type is a store instruction and wherein said second instruction type is a load instruction.

16. A cache apparatus as described in claim 13 wherein said stalling means temporarily prevents said microprocessor from executing said store instruction until said storage means indicates that no cache miss instructions are pending before said first processing means.

17. A cache apparatus as described in claim 15 wherein said stalling means temporarily prevents said microprocessor from executing said store instruction until said storage means indicates that no cache miss load instructions are pending before said first processing means.

18. A cache apparatus as described in claim 15 wherein said stalling means temporarily prevents said microprocessor from executing said load instruction until said storage means indicates that less than a maximum number of cache miss load instructions are pending before said first processing means.

19. A cache apparatus as described in claim 12 wherein said first processing means comprises completion means for indicating to said storage means that a cache miss instruction is completely processed by said first processing means and is therefore no longer pending before said first processing means.

20. A cache apparatus as described in claim 12 further comprising:

miss indicating means for generating a miss indication associated with each microprocessor instruction having an associated data address which is not accessible by said cache memory means, said miss indicating means coupled to said storage means.

21. A cache apparatus as described in claim 19 further comprising:

miss indicating means for generating a miss indication associated with each microprocessor instruction having an associated data address which is not accessible by said cache memory means, said miss indicating means coupled to said storage means.

22. A cache apparatus as described in claim 18 wherein said maximum number of cache miss load instructions is three.

23. A cache apparatus as described in claim 12 wherein said storage means is a logical counter having an increment input and a decrement input.

24. A cache apparatus as described in claim 21 wherein:

said cache memory means is a logical memory array;

said storage means is a logical counter having an increment input and a decrement input;

said miss indicating means increments said logical counter upon each miss indication, said miss indicating means coupled to said increment input of said logical counter; and wherein said completion means decrements said logical counter upon each cache miss instruction that is completely processed by said first processing means, said completion means coupled to said decrement input of said logical counter.

25. A cache apparatus for use with a microprocessor, said microprocessor processing a plurality of instructions each having associated data, said apparatus comprising:

cache memory army for providing high speed memory cache operations with said microprocessor;

first processing means for executing preceding cache miss load instructions each having an associated data address that is not accessible by said cache memory array; and stalling means for temporarily preventing said microprocessor from executing a subsequent store instruction while one or more of said preceding cache miss load instructions are pending before said first processing means, said stalling means also for allowing said microprocessor to execute a subsequent load instruction while less than a predetermined number of said preceding cache miss load instructions are pending before said first processing means.

26. A cache apparatus as described in claim 25 further comprising:

storage means for indicating if any of said preceding cache miss load instructions are pending before said first processing means, said storage means communicatively coupled to said stalling means and also communicatively coupled to said first processing means; and miss indicating means for generating a miss indication associated with each cache miss load instruction, said miss indicating means coupled to said storage means.

27. A cache apparatus as described in claim 26 wherein said first processing means comprises completion means for indicating to said storage means that a cache miss load instruction is completely processed by said first processing means and is therefore no longer pending before said first processing means.

28. A cache apparatus as described in claim 27 wherein:

said storage means is a logical counter having an increment input and a decrement input;

said miss indicating means increments said logical counter upon each miss indication, said miss indicating means coupled to said increment input of said logical counter; and said completion means decrements said logical counter upon each cache miss load instruction that is completely processed by said first processing means, said completion means coupled to said decrement input of said logical counter.

29. A cache apparatus for use with a microprocessor, said microprocessor processing a plurality of instructions each having associated data, said apparatus comprising:

cache memory array for high speed memory operations with said microprocessor;

bus control logic executing cache miss instructions each having an associated data address that is not accessible by said cache memory array, said bus control logic further comprising a queue for containing any of said cache miss instructions that are pending before said bus control logic; and gating logic asserting a stall signal to temporarily prevent said microprocessor from executing a first instruction type while one or more of said cache miss instructions are pending before said bus control logic, said gating logic deasserting said stall signal to allow said microprocessor to execute a second instruction type while one or more of said cache miss instructions are pending before said bus control logic.

30. A cache apparatus as described in claim 29 further comprising a logical counter for indicating the number of said cache miss instructions that are pending before said bus control logic, said logical counter communicatively coupled to said gating logic and also communicatively coupled to said bus control logic.

31. A cache apparatus as described in claim 29 wherein said first instruction type is a store instruction.

32. A cache apparatus as described in claim 31 wherein said second instruction type is a load instruction.

33. A cache apparatus as described in claim 32 wherein said gating logic temporarily prevents said microprocessor from executing said store instruction until said logical counter indicates that no cache miss instructions are pending before said bus control logic.

34. A cache apparatus as described in claim 32 wherein said gating logic temporarily prevents said microprocessor from executing said load instruction until said logical counter indicates that less than a maximum number of cache miss load instructions are pending before said bus control logic.

35. A cache apparatus as described in claim 32 wherein said bus control logic asserts a digital fill signal indicating to said logical counter that a cache miss instruction is completely processed by said bus control logic and is therefore no longer pending.

36. A cache apparatus as described in claim 35 further comprising:

comparator logic asserting a miss signal associated with each microprocessor instruction having an associated data address which is not accessible by said cache memory array, said comparator logic coupled to said logic counter.

37. A cache apparatus as described in claim 32 wherein said logical counter includes an increment input and a decrement input.

38. A cache apparatus as described in claim 36 wherein:

said logical counter includes an increment input and a decrement input;

said miss signal of said comparator logic increments said logical counter upon each miss indication, said miss signal communicatively coupled to said increment input of said logical counter; and said digital fill signal of said bus control logic decrements said logical counter upon completion of each pending cache miss instruction, said digital fill signal communicatively coupled to decrement input of said logical counter.

39. A method for partial execution blocking a microprocessor by a cache unit, said microprocessor for processing a plurality of instructions each having associated data, said method comprising the steps of:

providing a cache memory array for providing high speed memory cache operations with said microprocessor;

performing a first execution step by executing cache miss instructions each having an associated data address that is not accessible by said cache memory array;

temporarily preventing said microprocessor from executing a first instruction type while one or more of said cache miss instructions are pending before said first execution step; and allowing said microprocessor to execute a second instruction type while less than a predetermined number of said cache miss instructions am pending before said first execution step.

40. A method as described in claim 39 further comprising the step of indicating a number of said cache miss instructions that are pending before said first execution step.

41. A method as described in claim 40 wherein said first instruction type is a store instruction.

42. A method as described in claim 41 wherein said second instruction type is a load instruction.

43. A method as described in claim 42 wherein said step of temporarily preventing said microprocessor from executing said store instruction operates until said step of indicating indicates that no cache miss load instructions are pending before said first execution step.

44. A method as described in claim 42 wherein said step of allowing said microprocessor to execute a second instruction type operates until said step of indicating indicates that a maximum number of cache miss load instructions are pending before said first execution step.

45. A method as described in claim 40 further comprising the step of asserting a signal each time a cache miss instruction is completely processed by said first execution step so that said step of indicating may update said number of said cache miss instructions that are pending before said first execution step.

46. A method as described in claim 40 further comprising the step of:

generating a miss indication signal associated with each microprocessor instruction having an associated data address which is not accessible by said cache memory array so that said step of indicating may update said number of said cache miss instructions that are pending before said first execution step.

47. A method as described in claim 46 further comprising the step of:

generating a miss indication signal associated with each microprocessor instruction having an associated data address which is not accessible by said cache memory array so that said step of indicating may update said number of said cache miss instructions that are pending before said first execution step.

48. A method as described in claim 47 wherein said step of indicating is implemented via a logical counter.

49. A computer system comprising:

a) a bus for providing a common communication pathway; a processor for executing a plurality of instructions each having associated data, said processor coupled to said bus; memory storage unit for storage and retrieval of said data, said memory storage unit coupled to said bus; a display for display of said data; a data input device for inputting data to said computer system; and b) a cache unit for interfacing cache memory with said processor, said cache unit comprising:
   a cache memory array for providing high speed memory cache operations with said processor;
   bus control logic for executing cache miss instructions each having an associated data address that is not accessible by said cache memory array, said bus control logic coupled to said bus; and
   stalling circuitry for temporarily preventing said processor from executing a first instruction type while one or more of said cache miss instructions are pending before said bus control logic, said stalling circuitry also for allowing said processor to execute a second instruction type while one or more of said cache miss instructions are pending before said bus control logic.

50. A computer system including a cache unit as described in claim 49 further comprising a storage device for indicating if any of said cache miss instructions are pending before said bus control logic, said storage device communicatively coupled to said stalling circuitry and also communicatively coupled to said bus control logic.

51. A computer system including a cache unit as described in claim 49 wherein said first instruction type is a store instruction.

52. A computer system including a cache unit as described in claim 49 wherein said second instruction type is a load instruction.

53. A computer system including a cache unit as described in claim 49 wherein said first instruction type is a store instruction and wherein said second instruction type is a load instruction.

54. A computer system including a cache unit as described in claim 51 wherein said stalling circuitry temporarily prevents said processor from executing said store instruction until said storage device indicates that no cache miss instructions are pending before said bus control logic.

55. A computer system including a cache unit as described in claim 53 wherein said stalling circuitry temporarily prevents said processor from executing said store instruction until said storage device indicates that no cache miss load instructions are pending before said bus control logic.

56. A computer system including a cache unit as described in claim 53 wherein said stalling circuitry temporarily prevents said processor from executing said load instruction until said storage device indicates that less than a maximum number of cache miss load instructions are pending before said bus control logic.

57. A computer system including a cache unit as described in claim 50 wherein said bus control logic comprises completion circuitry for indicating to said storage device that a cache miss instruction is completely processed by said bus control logic and is therefore no longer pending before said bus control logic.

58. A computer system including a cache unit as described in claim 50 further comprising:

miss indicating circuitry for generating a miss indication associated with each instruction having an associated data address which is not accessible by said cache memory array, said miss indicating circuitry coupled to said storage device.

59. A computer system including a cache unit as described in claim 57 further comprising:

miss indicating circuitry for generating a miss indication associated with each instruction having an associated data address which is not accessible by said cache memory army, said miss indicating circuitry coupled to said storage device.

60. A computer system including a cache unit as described in claim 56 wherein said maximum number of cache miss load instructions is three.

61. A computer system including a cache unit as described in claim 50 wherein said storage device is a logical counter having an increment input and a decrement input.

62. A computer system including a cache unit as described in claim 59 wherein:

said storage device is a logical counter having an increment input and a decrement input;

said miss indicating circuitry includes circuitry to increment said logical counter upon each miss indication, said miss indicating circuitry coupled to said increment input of said logical counter; and said completion circuitry includes circuitry to decrement said logical counter upon each cache miss instruction that is completely processed by said bus control logic, said completion circuitry coupled to said decrement input of said logical counter.

63. A cache logic apparatus for interfacing a processor and a cache memory array of said cache logic apparatus, said processor sequentially processing a plurality of instructions each having associated data, said apparatus comprising:

a cache memory array for providing high speed memory cache operations with said microprocessor, said cache memory army communicatively coupled with said microprocessor;

first processing logic for sequentially executing preceding cache miss load instructions each having an associated data address that is not accessible by said cache memory array; and stalling circuitry for temporarily preventing said processor from executing a subsequent store instruction while one or more of said preceding cache miss load instructions are pending before said first processing logic but not yet completely processed by said first processing logic, said stalling circuitry also for allowing other of said plurality of instructions to execute, said other of said plurality of instructions being other than store instructions.

* * * * *

UNITED STATES PATENT AND TRADEMARK OFFICE
CERTIFICATE OF CORRECTION

PATENT NO.   :   5,455,924
DATED        :   October 3, 1995
INVENTOR(S)  :   Shenoy et al.

It is certified that error appears in the above-identified patent and that said Letters Patent is hereby corrected as shown below:

In the following locations, delete "army" and substitute --array--:

column 20, line 51
    column 24, line 32
    column 24, line 61

In column 22, at line 43, delete "am" and substitute --are--.

Signed and Sealed this

Fourteenth Day of January, 1997

Attest:

BRUCE LEHMAN

*Attesting Officer*   *Commissioner of Patents and Trademarks*